United States Patent
Tian

(10) Patent No.: US 7,103,486 B2
(45) Date of Patent: Sep. 5, 2006

(54) DEVICE FOR MONITORING A NEUTRAL AND EARTH BREAK AND ELECTRICAL SWITCHGEAR APPARATUS COMPRISING SUCH A DEVICE

(75) Inventor: Simon Tian, Chalon (FR)

(73) Assignee: Schneider Electric Industries SAS, Rueil Malmaison (FR)

(*) Notice: Subject to any disclaimer, the term of this patent is extended or adjusted under 35 U.S.C. 154(b) by 162 days.

(21) Appl. No.: 10/610,530

(22) Filed: Jul. 2, 2003

(65) Prior Publication Data
US 2004/0024545 A1     Feb. 5, 2004

(30) Foreign Application Priority Data
Jul. 18, 2002  (FR) .................. 02 09148

(51) Int. Cl.
*G01R 19/00* (2006.01)

(52) U.S. Cl. .......................... 702/64; 361/42

(58) Field of Classification Search ............ 702/57–59, 702/64, 65, 72, 10, 117, 118, 122, 124, 126, 702/185, 189; 361/42–50, 76, 86, 96, 104, 361/111; 324/509
See application file for complete search history.

(56) References Cited

U.S. PATENT DOCUMENTS

| | | | | |
|---|---|---|---|---|
| 4,020,394 A | * | 4/1977 | Potash | 361/45 |
| 4,068,276 A | * | 1/1978 | Pintell | 361/46 |
| 4,931,893 A | * | 6/1990 | Glennon et al. | 361/45 |
| 4,994,933 A | * | 2/1991 | Matsuoka | 361/42 |
| 5,894,393 A | * | 4/1999 | Elliott et al. | 361/42 |
| 5,956,218 A | * | 9/1999 | Berthold | 361/42 |
| 5,990,685 A | * | 11/1999 | Nightall | 324/509 |
| 6,005,757 A | * | 12/1999 | Shvach et al. | 361/64 |
| 6,175,479 B1 | * | 1/2001 | Boyd et al. | 361/96 |
| 6,577,478 B1 | * | 6/2003 | Kim et al. | 361/42 |
| 6,718,271 B1 | * | 4/2004 | Tobin | 702/58 |
| 6,807,037 B1 | * | 10/2004 | Patruno et al. | 361/42 |
| 6,816,352 B1 | * | 11/2004 | Hoopes | 361/104 |
| 6,829,129 B1 | * | 12/2004 | Marsh et al. | 361/111 |

FOREIGN PATENT DOCUMENTS

FR    2 697 385 A    4/1994

* cited by examiner

*Primary Examiner*—Hal Wachsman
*Assistant Examiner*—Mohamed Charioui
(74) *Attorney, Agent, or Firm*—Steptoe & Johnson LLP

(57) ABSTRACT

The monitoring device of a neutral conductor and earth conductor comprises processing means, and first voltage detection means to supply a first signal representative of a voltage between neutral and earth to said processing means. The device also comprises second voltage detection means to supply a second signal representative of a voltage between phase and earth to said processing means, and third voltage detection means to supply a third signal representative of a voltage between phase and neutral to said processing means. The processing means supply a loss neutral of signal and/or a loss of earth signal according to the values of the first, second and third signal. The electrical switchgear apparatus comprises such a monitoring device to trigger opening of main contacts.

17 Claims, 4 Drawing Sheets

DEVICE FOR MONITORING A NEUTRAL AND EARTH BREAK AND ELECTRICAL SWITCHGEAR APPARATUS COMPRISING SUCH A DEVICE

BACKGROUND OF THE INVENTION

The invention relates to a device for monitoring neutral and earth conductors comprising:
  processing means to supply a loss of neutral detection signal, and
  first voltage detection means designed to be connected between a neutral conductor and an earth conductor to supply a first signal representative of a voltage between neutral and earth to said processing means.

The invention also relates to an electrical switchgear apparatus comprising main electrical contacts connected between an input and an output, a trip relay for triggering opening of said main contacts, the input comprising a neutral conductor terminal, an earth conductor terminal and at least one phase conductor terminal.

STATE OF THE ART

Known monitoring devices comprising loss of neutral conductor detection circuits and sometimes loss of earth conductor detection circuits are based on voltage measurement between an input receiving the neutral voltage and an input receiving the earth line.

FIG. 1 shows a monitoring device 1 connected to an electrical power system 2 to be monitored. The power system comprises an AC voltage source 3 comprising a neutral conductor N, a phase conductor Ph and an earth line PE connected to an earth connection 4. Depending on the neutral system, the neutral conductor can be connected to the earth line PE or the earth connection 4 directly or via an impedance 5.

The phase, neutral and earth conductors often run through various terminals and connection circuits 6 before reaching the electrical loads 7. Certain loads may require a connection to the earth conductor, in particular for grounding metal casings and electrical filters.

A monitoring device connected to the conductors of the monitored power system monitors the presence of the neutral conductor in order to prevent voltage surge risks and risks of not supplying protection circuits requiring an auxiliary power source. If a voltage surge due in particular to disconnection of the neutral conductor is detected, the device can order a switchgear apparatus 8 to open to interrupt the power supply to the load 7.

A state-of-the-art device detecting loss of neutral and loss of earth is described in U.S. Pat. No. 4,931,893. This circuit uses discharging of a capacitor into a neutral or earth conductor.

Known monitoring devices of the state of the art do not enable sufficiently secured detection and annunciation of disconnection of a neutral or earth conductor.

SUMMARY OF THE INVENTION

The object of the invention is to provide a neutral conductor monitoring device enabling secured detection of a neutral or earth conductor and an electrical switchgear apparatus comprising such a monitoring device.

A monitoring device according to the invention comprises:
  second voltage detection means designed to be connected between a phase conductor and the earth conductor to supply a second signal representative of a voltage between phase and earth to said processing means, and
  third voltage detection means designed to be connected between the phase conductor and the neutral conductor to supply a third signal representative of a voltage between phase and neutral to said processing means,
the processing means supplying a loss of neutral signal and/or a loss of earth signal according to the values of said first signal supplied by said first detection means, of said second signal supplied by said second detection means, and of said third signal supplied by said third detection means.

In a preferred embodiment, the processing means supply a neutral, phase, and/or earth conductor connection error signal according to the values of said first signal supplied by said first detection means, of said second signal supplied by said second detection means, and of said third signal supplied by said third detection means.

Advantageously, the monitoring device comprises loss of neutral and/or loss of earth fault annunciation means connected to the processing means.

Preferably, the processing means supply a normal connections signal when:
  the first signal representative of a voltage between neutral and earth is lower than a first preset threshold,
  the second signal representative of a voltage between phase and earth is higher than a second preset threshold, and
  the third signal representative of a voltage between phase and neutral is higher than a third preset threshold.

Preferably, the processing means supply a loss of neutral conductor signal when:
  the second signal representative of a voltage between phase and earth is higher than a second preset threshold, and
  the third signal representative of a voltage between phase and neutral is lower than a third preset threshold.

Preferably, the processing means supply a loss of earth conductor signal when:
  the second signal representative of a voltage between phase and earth is lower than a second preset threshold, and
  the third signal representative of a voltage between phase and neutral is higher than a third preset threshold.

Preferably, the processing means supply a connection error signal when:
  the first signal representative of a voltage between neutral and earth is higher than a first preset threshold,
  the second signal representative of a voltage between phase and earth is lower than a second preset threshold, and
  the third signal representative of a voltage between phase and neutral is higher than a third preset threshold.

Advantageously, the first, second and third detection means comprise means for electrical isolation between the input signals and output signals.

Advantageously, the processing means comprise an autonomous electric power supply supplying electric power to the circuits of said processing means in case of a failure of the normal power supply.

An electrical switchgear apparatus according to an embodiment of the invention comprises at least one monitoring device as defined above supplying an opening signal to the trip relay, the first voltage detection means being connected between the neutral conductor terminal and the earth conductor terminal, the second voltage detection means being connected between the phase conductor terminal and the earth conductor terminal, and the third voltage detection means being connected between the phase conductor terminal and the neutral conductor terminal.

BRIEF DESCRIPTION OF THE DRAWINGS

Other advantages and features will become more clearly apparent from the following description of particular embodiments of the invention given as non-restrictive examples only and represented in the accompanying drawings in which.

DETAILED DESCRIPTION OF PREFERRED EMBODIMENTS

Figure 1:
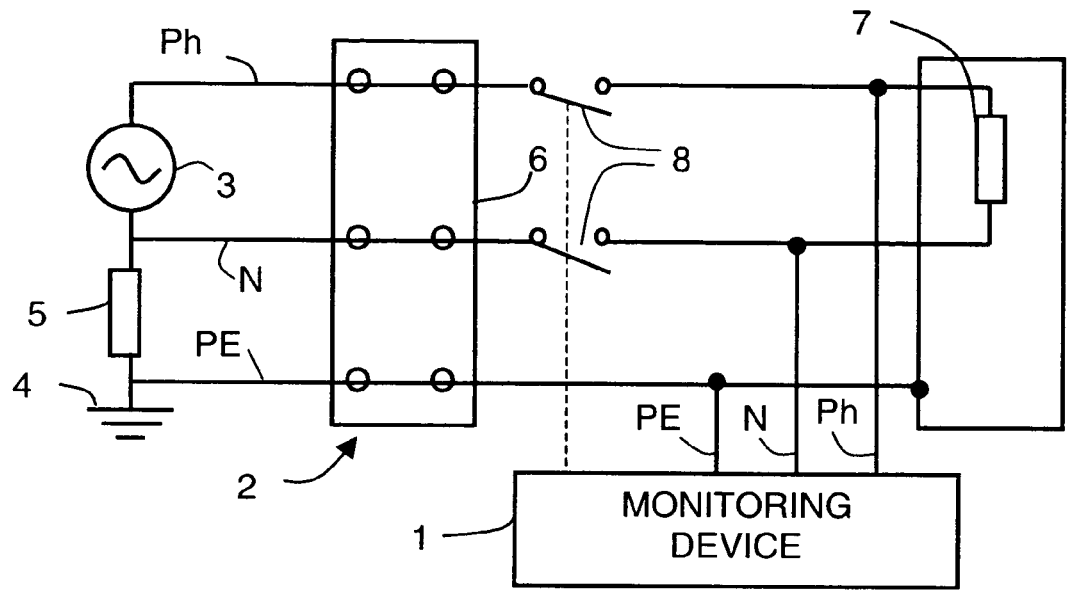
FIG. 1 represents a diagram of an installation with a prior art monitoring device connected to an electric power system to be monitored.
Figure 2:
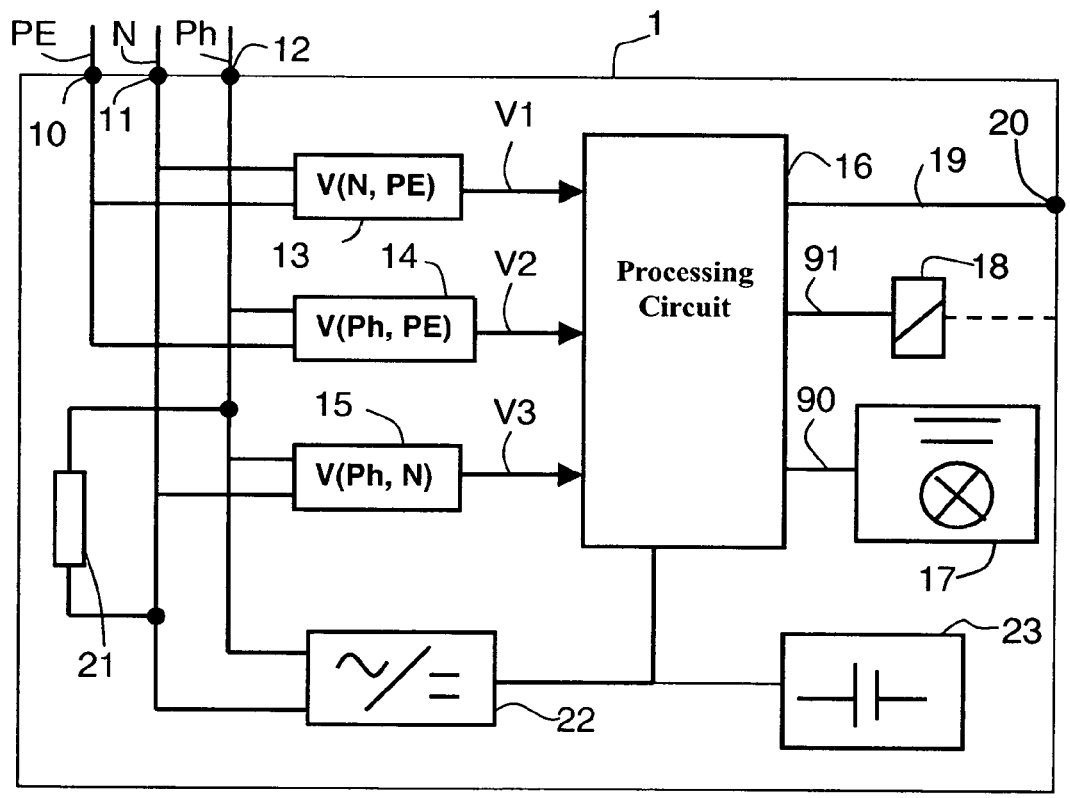
FIG. 2 represents a block diagram of a monitoring device according to an embodiment of the invention.

FIG. 2 represents a block diagram of a monitoring device 1 according to an embodiment of the invention. This device comprises an input 10 for connection to an earth conductor PE, an input 11 for connection to a neutral conductor N, and an input 12 for connection to a phase conductor Ph. A first voltage detection circuit 13 is connected between the input 10 and the input 11 to supply a signal V1 representative of a voltage between the neutral conductor and the earth conductor. A second voltage detection circuit 14 is connected between the input 10 and the input 12 to supply a signal V2 representative of a voltage between a phase conductor and the earth conductor. A third voltage detection circuit 15 is connected between the input 11 and the input 12 to supply a signal V3 representative of a voltage between a phase conductor and the neutral conductor.

A processing circuit 16 receives the signals V1, V2 and V3 supplied by the detection circuits and supplies output signals, according to the values of said signals V1, V2 and V3. The output signals are notably signals representative of loss of neutral and/or loss of earth and/or connection error. Thus, the processing circuit supplies annunciation signals 90 to an annunciation device 17 and/or a control signal 91 to a relay 18 and/or a detection signal 19 on an output 20.

An impedance 21 connected between the phase and neutral inputs enables detection to be improved when a load 7 is not connected to the power supply system.

A power supply circuit 22 connected between the phase and neutral inputs, respectively 12 and 11, supplies electric power to the processing circuit and annunciation device. An autonomous back-up power supply 23 provides electric power even when a voltage between phase and neutral is no longer present, in particular in case of a fault following a loss of neutral or phase.

Figure 3:
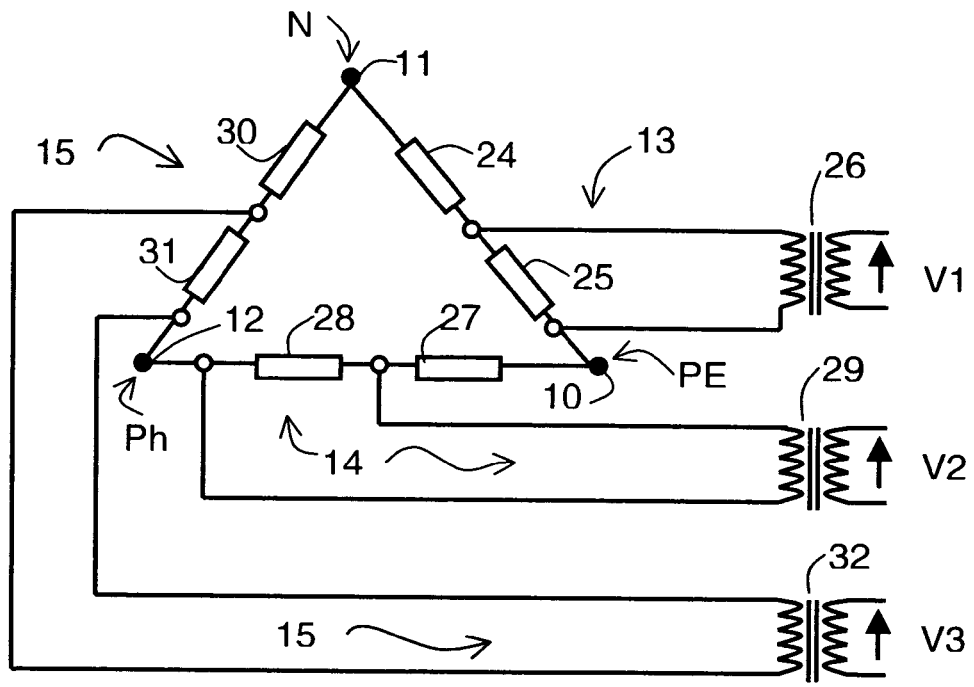
FIG. 3 represents a diagram of voltage detection means for a monitoring device according to a first embodiment of the invention.

FIG. 3 represents a schematic diagram of voltage detection circuits for a monitoring device according to a first embodiment of the invention. The detection circuits comprise a resistive divider bridge associated with a transformer to achieve electrical insulation between the power supply system and the processing circuit.

The detection circuit 13 comprises resistors 24 and 25 in series connected between the inputs 11 and 10, and a transformer 26 having a primary winding connected to the resistor 25 and a secondary winding supplying the signal V1 to the processing circuit 16. The detection circuit 14 comprises resistors 27 and 28 in series connected between the inputs 10 and 12, and a transformer 29 having a primary winding connected to the resistor 28 and a secondary winding supplying the signal V2 to the processing circuit 16. The detection circuit 15 comprises resistors 30 and 31 in series connected between the inputs 11 and 12, and a transformer 32 having a primary winding connected to the resistor 31 and a secondary winding supplying the signal V3 to the processing circuit 16.

Figure 4:
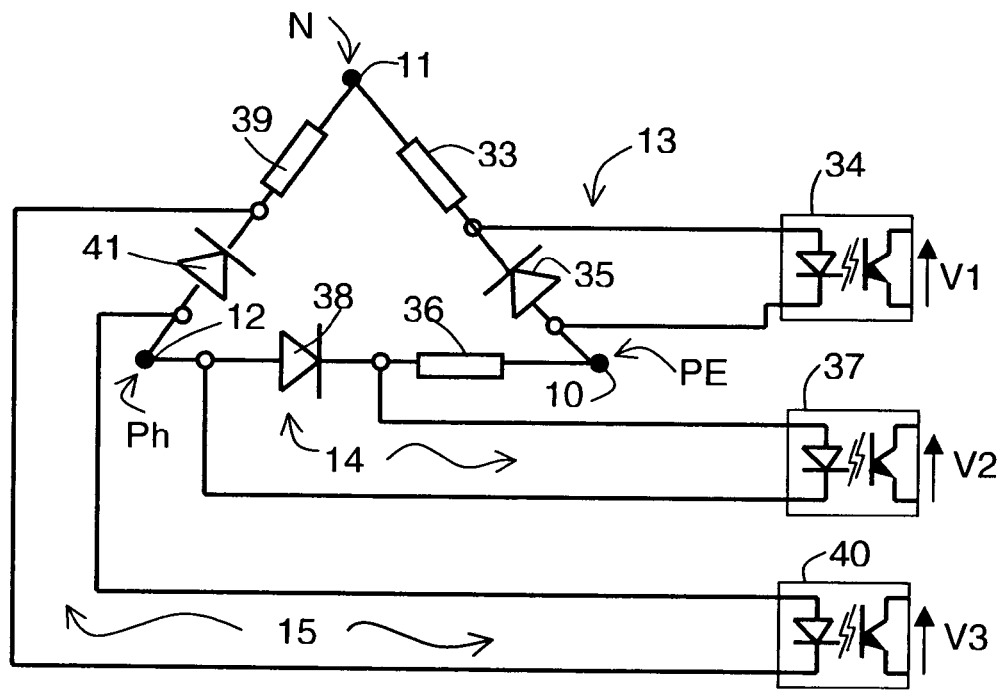
FIG. 4 represents a diagram of voltage detection means for a monitoring device according to a second embodiment of the invention.

FIG. 4 represents a block diagram of voltage detection circuits for a monitoring device according to a second embodiment of the invention. The detection circuits comprise a current limiting resistor connected in series with an optic coupler and a protection diode connected head-to-tail. The optic coupler perform the electrical insulation between the power supply system and the processing circuit.

The detection circuit 13 comprises a resistor 33 in series with an input of an optic coupler 34 and a reverse protection diode 35 connected between the inputs 11 and 10, the optic coupler having an output to supply the signal V1 to the processing circuit 16. The detection circuit 14 comprises a resistor 36 in series with an input of an optic coupler 37 and a reverse protection diode 38 connected between the inputs 10 and 12, the optic coupler having an output to supply the signal V2 to the processing circuit 16. The detection circuit 15 comprises a resistor 39 in series with an input of an optic coupler 40 and a reverse protection diode 41 connected between the inputs 11 and 12, the optic coupler having an output to supply the signal V3 to the processing circuit 16. The outputs of the optic couplers can be phototransistors polarized by components of the processing circuit 16.

Figure 5:
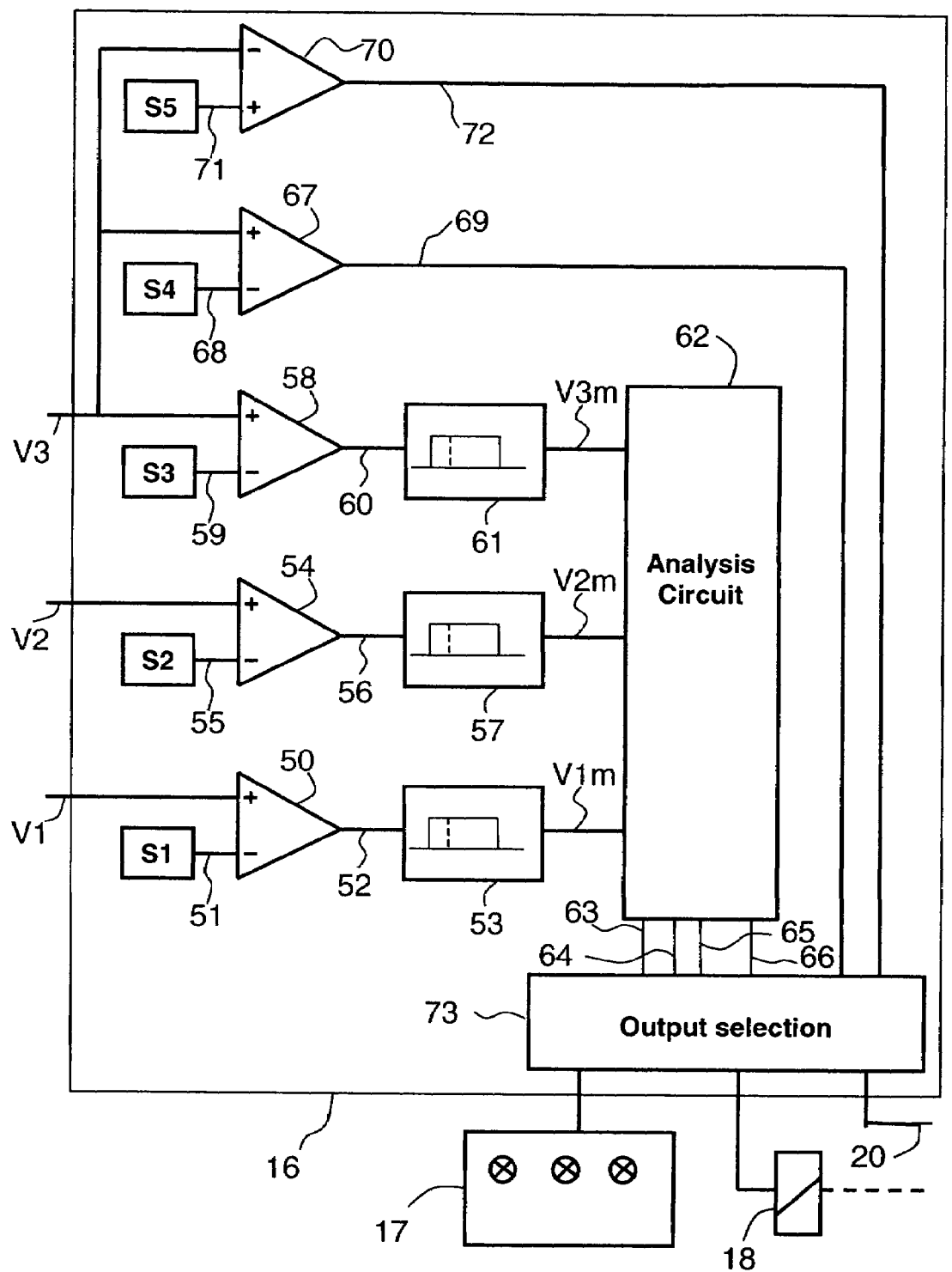
FIG. 5 represents a diagram of a processing circuit monitoring device according to an embodiment of the invention.

FIG. 5 represents a block diagram of a processing circuit 16 for a monitoring device according to an embodiment of the invention. A first comparator 50 receives the signal V1 and compares it with a first threshold 51 to supply an output signal 52 to a temporary storage circuit 53. A second comparator 54 receives the signal V2 and compares it with a second threshold 55 to supply an output signal 56 to a temporary storage circuit 57. A third comparator 58 receives the signal V3 and compares it with a third threshold 59 to supply an output signal 60 to a temporary storage circuit 61. The circuits 53, 57 and 61 supply signals V1m, V2m and V3m to an analysis circuit 62 which enables the type of fault to be detected, by supplying notably a loss of neutral signal 63, a loss of earth signal 64, a connection error signal 65, or a normal operation signal 66.

The analysis circuit preferably supplies a normal connections signal when the signal V1 is lower than the threshold 51, the signal V2 is higher than the threshold 55, and the signal V3 is higher than the threshold 59.

The analysis circuit preferably supplies a loss of neutral conductor signal 63 when the signal V2 is higher than the threshold 55, and the signal V3 is lower than the threshold 59.

The analysis circuit preferably supplies a loss of earth conductor signal when the signal V2 is lower than the threshold 55, and the signal V3 is higher than the threshold 59.

The analysis circuit preferably supplies a connection error signal when the signal V1 is higher than the threshold 51, the signal V2 is lower than the threshold 55, and the signal V3 is higher than the threshold 59.

For example, the thresholds 51, 55, 59 can correspond to voltages having effects between 20% and 80% of a rated power system voltage 3. The effects of these thresholds are preferably comprised between 40% and 60% of the rated voltage 3 of the power system 2.

In the example of FIG. 5, the processing circuit 16 comprises a fourth comparator 67 receiving the signal V3 representative of a voltage between a phase and neutral to compare it with a fourth threshold 68 and supply a voltage surge detection signal 69, and a fifth comparator 70 receiving the signal V3 to compare it with a low threshold 71 and supply an undervoltage or voltage drop detection signal 72.

The signals 63, 64, 65, 66 69 and/or 70 can be applied to an output selection circuit 73 to set the parameters of the signals that will control the annunciation devices 17, the signals that will trigger the relay 18, and/or the signals that will be sent to the communication output 20. For example, all the signals can be sent to the output 20, the loss of neutral, loss of earth and voltage surge signals can command the relay 18, and the loss of neutral, loss of earth, connection error, and normal operation signals can be supplied to the annunciation device 17.

Figure 6:
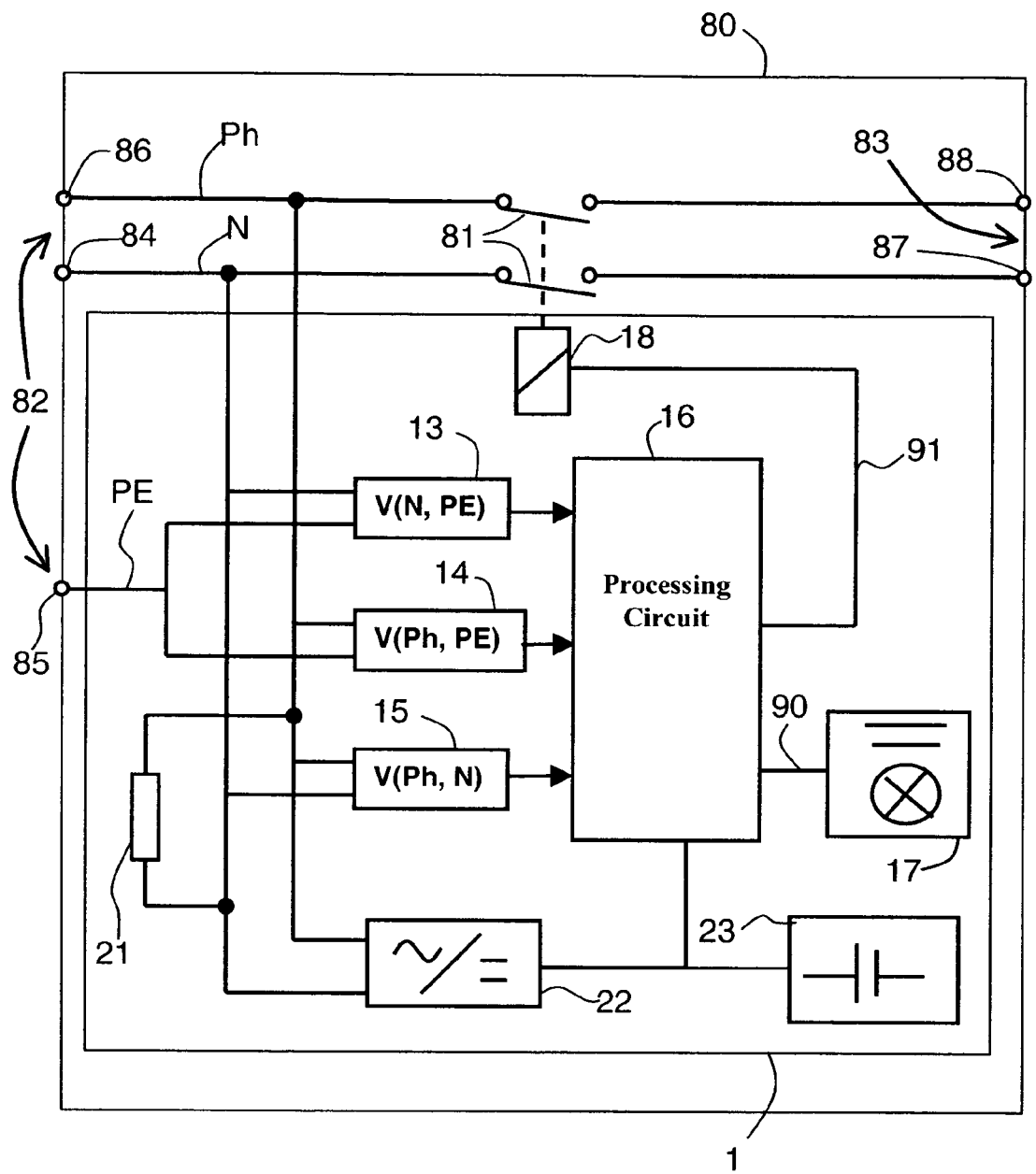
FIG. 6 represents the diagram of an electrical switchgear apparatus comprising a monitoring device according to an embodiment.

FIG. 6 represents the schematic diagram of an electrical apparatus 80 comprising a monitoring device according to an embodiment of the invention. The apparatus 80 is an electrical switchgear apparatus comprising main electrical contacts 81 connected between an input 82 and an output 83, and a trip relay 18 to trigger opening of said main contacts. The input 82 comprises a neutral conductor terminal 84, an earth conductor terminal 85 and at least one phase conductor terminal 86. The output comprises a neutral output terminal 87 and at least one phase output terminal 88 to supply a load or a down-line part of an electrical installation.

The apparatus 80 comprises a monitoring device 1, for example as described in the above embodiments, to supply an opening signal 90 to the trip relay 18.

The first voltage detection circuit 13 is connected between the neutral conductor terminal 84 and the earth conductor terminal 85. The second voltage detection circuit 14 is connected between the phase conductor terminal 86 and the earth conductor terminal 85. The third voltage detection circuit 15 is connected between the phase conductor terminal 86 and the neutral conductor terminal 84.

In the embodiments described above, the different circuits have been represented in separate manner. For example, the circuits 53, 57 and 61 can be achieved with delayed-action monostable circuits, and the circuit 62 can be a three-to-eight decoding circuit. However, in other embodiments of the invention, functions of the circuits can be performed by components that are analog, digital and/or grouped and integrated in a single component. It is also possible to perform certain functions with a programmable component such as a microprocessor or a microcontroller.

The annunciation device 17 can comprise light-emitting diodes, liquid crystal displays or other types of indicating means.

The embodiments above show single-phase power schemes but the invention also relates to devices operating on a three-phase power system. In this case, the phase conductors can comprise rectifying circuits to operate with detection circuits as represented in FIG. 4.

The electrical apparatus 80 can be in particular a circuit breaker or a switch, and it can also comprise other electrical protection functions, for example earth leakage, overload or short-circuit protections.

The invention claimed is:

1. A monitoring device for monitoring a neutral conductor and an earth conductor comprising:
   processing means for supplying a loss of neutral detection signal,
   first voltage detection means for connection between a neutral conductor and an earth conductor to supply to said processing means a first signal representative of a voltage between neutral and earth,
   second voltage detection means for connection between a phase conductor and an earth conductor to supply to said processing means a second signal representative of a voltage between phase and earth, and
   third voltage detection means for connection between a phase conductor and a neutral conductor to supply to said processing means a third signal representative of a voltage between phase and neutral,
   said processing means supplies a loss of neutral signal and a separate and independent loss of earth signal according to the values of a first signal supplied by said first detection means, of a second signal supplied by said second detection means, and of a third signal supplied by said third detection means.

2. A monitoring device according to claim 1 wherein the processing means is for supplying a neutral, phase, and/or earth conductor connection error signal according to the values of a first signal supplied by said first detection means, of second signal supplied by said second detection means, and of a third signal supplied by said third detection means.

3. A monitoring device according to claim 1 additionally comprising loss of neutral and/or loss of earth fault annunciation means connected to the processing means.

4. A monitoring device according to claim 1 wherein the processing means is for supplying a normal connections signal when:
   a first signal representative of a voltage between neutral and earth is lower than a first preset threshold,
   a second signal representative of a voltage between phase and earth is higher than a second preset threshold, and
   a third signal representative of a voltage between phase and neutral is higher than a third preset threshold.

5. A monitoring device according to claim 1 wherein the processing means is for supplying a loss of neutral conductor signal when:
   a second signal representative of a voltage between phase and earth is higher than a second preset threshold, and
   a third signal representative of a voltage between phase and neutral is lower than a third preset threshold.

6. A monitoring device according to claim 1 wherein the processing means is for supplying a loss of earth conductor signal when:
   a second signal representative of a voltage between phase and earth is lower than a second preset threshold, and
   a third signal representative of a voltage between phase and neutral is higher than a third preset threshold.

7. A monitoring device according to claim 1 wherein the processing means is for supplying a connection error signal when:
   a first signal representative of a voltage between neutral and earth is higher than a first preset threshold, a second signal representative of a voltage between phase and earth is lower than a second preset threshold, and a third signal representative of a voltage between phase and neutral is higher than a third preset threshold.

8. A monitoring device according to claim 1 wherein the first, second and third detection means comprise means for electrical isolation between input signals and output signals.

9. A monitoring device according to claim 1 wherein the processing means comprise an autonomous electric power supply for supplying electric power to the circuits of said processing means in case of failure of the normal power supply.

10. The monitoring device of claim 1, wherein said processing means includes at least a first output for supplying the loss of neutral signal and a second output, different from said first output, for supplying the loss of earth signal.

11. A monitor of neutral and earth states, comprising:
a first voltage detector configured to detect a value of a voltage between neutral and earth;
a second voltage detector configured to detect a value of a voltage between phase and earth;
a third voltage detector configured to detect a value of a voltage between phase and neutral;
a processor configured to generate a loss of neutral signal or a separate and independent loss of earth signal based on the value detected by each of said first, second, and third voltage detectors.

12. The monitor of claim 11, further comprising:
said first voltage detector connected between a neutral conductor and an earth conductor;
said second voltage detector connected between a phase conductor and said earth conductor; and
said third voltage detector connected between said phase conductor and said neutral conductor.

13. The monitor of claim 11, wherein said processor includes at least a first output for supplying the loss of neutral signal and a second output, different from said first output for supplying the loss of earth signal.

14. Electrical switchgear apparatus comprising:
main electrical contacts connected between an input and an output, said input comprising a neutral conductor terminal, an earth conductor terminal and at least one phase conductor terminal,
a trip relay for triggering opening of said main contacts, and
at least one monitoring device for supplying an opening signal to the trip relay,
the first voltage detection means being connected between the neutral conductor terminal and the earth conductor terminal, the second voltage detection means being connected between the phase conductor terminal and the earth conductor terminal, and the third voltage detection means being connected between the phase conductor terminal and the neutral conductor terminal;

the monitoring device comprising:
first voltage detection means for connection between a neutral conductor and an earth conductor to supply a first signal representative of a voltage between neutral and earth,
second voltage detection means for connection between a phase conductor and the earth conductor to supply a second signal representative of a voltage between phase and earth, and
third voltage detection means for connection between the phase conductor and the neutral conductor to supply a third signal representative of a voltage between phase and neutral, and
a processing means for supplying a loss of neutral signal and a separate and independent loss of earth signal according to the values of a first signal supplied by said first detection means, of a second signal supplied by said second detection means, and of a third signal supplied by said third detection means.

15. The apparatus of claim 14, wherein said processing means includes at least a first output for supplying the loss of neutral signal and a second output, different from said first output, for supplying the loss of earth signal.

16. A method of monitoring neutral and earth states, comprising:
first detecting a value of a voltage between neutral and earth;
second detecting a value of a voltage between phase and earth;
third detecting a value of a voltage between phase and neutral;
processing the values detected by each of said first, second, and third detections; and
generating a loss of neutral signal and a separate and independent loss of earth signal in response to said processing.

17. The method of claim 16, wherein said generating comprises generating the loss of earth signal on a different output than said loss of neutral signal.

* * * * *